INVENTOR.
Rene A. Braden
BY
C. D. Tuska
ATTORNEY.

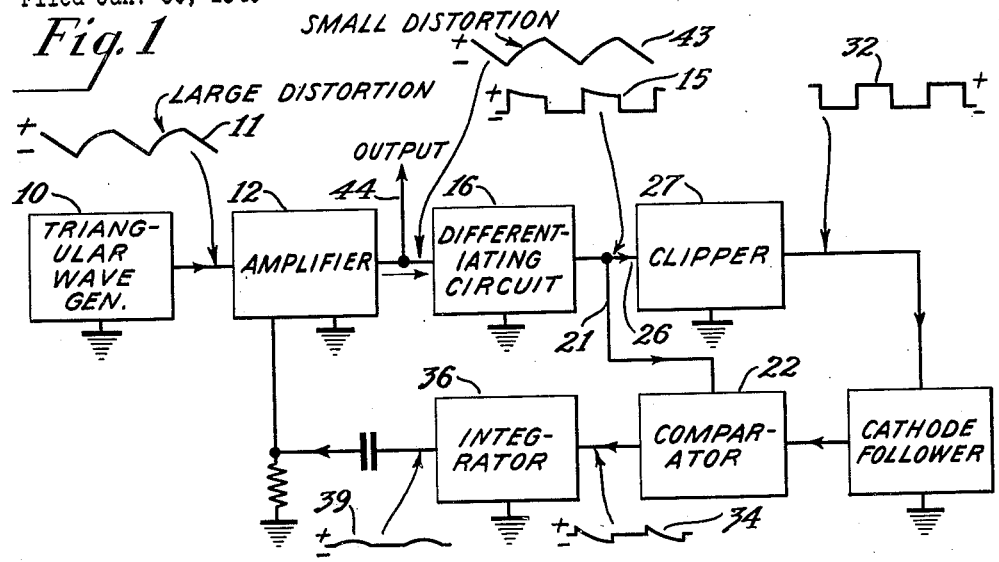

Patented May 9, 1950

2,506,770

UNITED STATES PATENT OFFICE 2,506,770

WAVE SHAPE CORRECTION CIRCUIT

Rene A. Braden, Princeton, N. J., assignor to Radio Corporation of America, a corporation of Delaware Application January 30, 1946, Serial No. 644,198

7 Claims. (Cl. 178—44)

My invention relates to wave shaping circuits and particularly to circuits for producing triangular or sawtooth waves that are linear in wave form.

An object of the invention is to provide an improved method of and means for producing periodic waves that have linear slopes.

A further object of the invention is to provide an improved method of and means for obtaining triangular or sawtooth waves of linear wave form.

A still further object of the invention is to provide an improved wave-form correcting circuit.

According to one embodiment of the invention a distorted or non-linear triangular wave is made linear in wave form by passing it through a feedback controlled amplifier and then differentiating the amplified wave whereby a wave of approximately square wave form is obtained. The amount the differentiated wave differs from a true square wave is a measure of the distortion of the triangular wave that is being applied to said amplifier. This differentiated wave is compared in a comparison circuit with a true square wave, the latter being obtained from the differentiated wave by means of a clipping circuit.

The output of the comparison circuit is the difference between the differentiated wave and the true square wave. This output is integrated and fed back degeneratively to the feed-back controlled amplifier to correct the shape of the triangular wave being applied to said amplifier.

Figure 3:
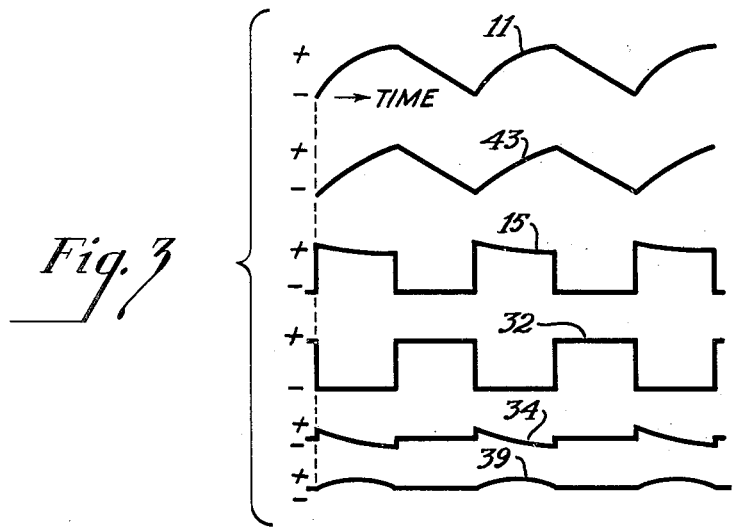

The invention will be better understood from the following description taken in connection with the accompanying drawing in which Figure 1 is a block diagram of one embodiment of the invention, Figure 2 is a circuit diagram of the apparatus shown in Fig. 1, Figure 3 is a group of graphs that are referred to in explaining the operation of the invention shown in Figs. 1 and 2, and Figures 4 and 5 are circuit and block diagrams, respectively, that illustrate other embodiments of the invention.

In the several figures, similar parts are indicated by similar reference characters.

Referring to Figs. 1, 2 and 3, a voltage wave of approximately the desired shape is produced by a generator 10 which, in the example illustrated, produces a triangular wave 11 that is undesirably distorted in wave form. It should be understood that the invention is not limited to the production of waves of the shape illustrated. The wave 11 is amplified by an amplifier 12 comprising amplifier tubes 13 and 14 and is then applied to a differentiating circuit 16 to obtain the differentiated wave 15.

The differentiating circuit 16 may comprise a vacuum tube 17 having a resistor 18 and an inductance coil 19 connected in series in its cathode circuit. The resistance of the resistor 18 and the tube 17 in series should be large compared with the impedance of the coil 19 in order to obtain good differentiation.

Part of the differentiated wave signal 15 is supplied directly over a lead 21 to a comparator circuit 22 which comprises resistors 23 and 24. The rest of the signal 15 is supplied over a conductor 26 to a clipping circuit 27. The circuit 27 may consist of two clipping tubes 28 and 29 and a polarity reversing tube 31.

The output of the clipping circuit 27 is a true square wave 32 which is applied through a cathode follower tube 33 to the comparator 22. It will now be seen that the differentiated wave 15 and the true square wave 32 are applied with opposite polarities to the resistors 23 and 24 in series whereby the difference voltage appears between the junction point of said resistors and ground. This difference voltage may have the wave form shown by the graph 34. The difference voltage 34 is applied to an integrating circuit 36 which may comprise a series resistor 37 and a shunt capacitor 38.

The integrated signal output of the integrating circuit 36 is represented by the graph 39 and is applied through a coupling capacitor 41 to the cathode end of a resistor 42 that is included together with a bias resistor 40 in the cathode circuit of the feed-back amplifier tube 13. As a result, the signal 39 is added to the input signal 11 whereby the linearity of the triangular wave form of the signal 11 is improved as illustrated by the graph 43. Thus, a signal of improved wave form may be taken from the output circuit of the amplifier 12 by way of an output lead 44, for example.

It will be understood that the correcting signal 39 is applied to the amplifier tube 13 in degenerative feedback relation whereby the output signal approaches a perfectly corrected signal as a limit. How perfectly the signal is corrected depends, of course, on the amount of gain in the feedback circuit.

Figure 4:
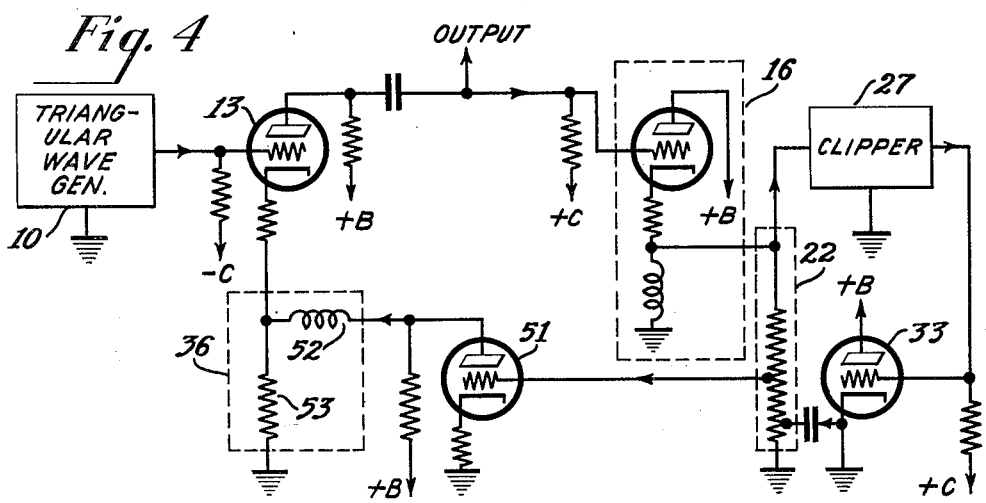

Fig. 4 shows a circuit that is similar to the one described above but which differs somewhat in the circuit details. An amplifier stage has been omitted between the wave generator 10 and the differentiating circuit 16, and an amplifier stage 51 has been added between the comparator 22 and the integrating network 36. The integrating circuit 36 is of a different type than that shown in Fig. 2. It comprises an inductance coil 52 and a resistor 53. The operation of the circuit of Fig. 4 is the same as previously described.

Figure 5:
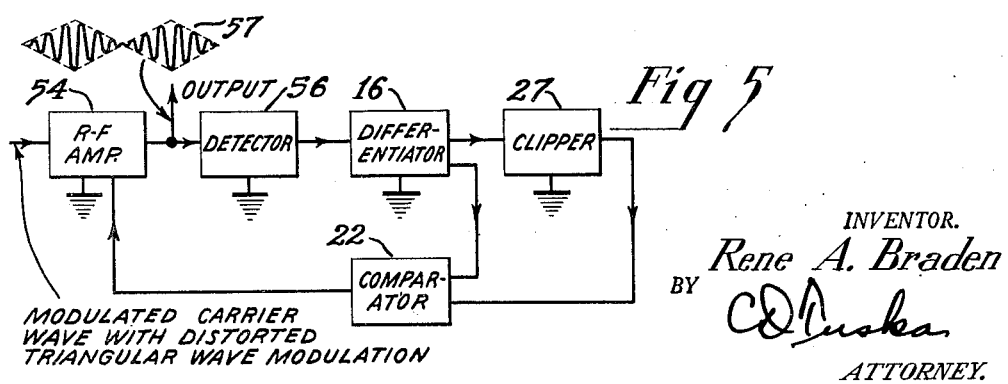

Fig. 5 shows the invention applied to a circuit for correcting the modulation of a radio frequency carrier wave. In this example, a carrier wave that has distorted triangular wave modulation thereon is applied to a radio frequency amplifier 54 and some of the amplified signal is demodulated in a detector 56. The resulting triangular wave is then treated by the circuits 16, 27 and 22 in the manner previously described to obtain the difference between a true rectangular wave and the distorted rectangular wave.

The difference signal thus obtained is applied to the amplifier 54 in differential feedback relation so that it controls the amplifier gain to correct the distortion of the carrier wave envelope. The corrected modulated wave, indicated at 57, may be taken from the amplifier output circuit as indicated.

I claim as my invention:

1. The method of improving the linearity of a periodic applied wave which comprises differentiating said wave, producing a true rectangular wave from said differentiated wave, combining said true rectangular wave and said differentiated wave to obtain a wave that is the difference between them, integrating said difference wave to obtain a correcting wave, and degeneratively feeding back said correcting wave for correcting non-linearity of said applied wave.

2. A wave-form correcting circuit for improving the linearity of an applied wave which comprises means for differentiating said applied wave, means for producing a true rectangular wave from said differentiated wave, means for comparing said true rectangular wave and said differentiated wave to obtain a wave that is the difference between them, means for integrating said difference wave to obtain a correcting wave, and means for degeneratively feeding back said correcting wave for correcting non-linearity of said applied wave.

3. The method of improving the linearity of a periodic applied wave which comprises differentiating said wave, producing a true rectangular wave from said differentiated wave, comparing said true rectangular wave and said differentiated wave to obtain a wave that is the difference between them, and degeneratively feeding back said difference wave for correcting non-linearity of said applied wave.

4. A wave-form correcting circuit for improving the linearity of a periodic wave which comprises an amplifier stage to which said wave is applied, means for differentiating the output wave of said amplifier stage, means for producing a true rectangular wave from said differentiated wave, means for comparing said true rectangular wave and said differentiated wave to obtain a wave that is the difference between them, and means for applying said difference wave to said amplifier stage in degenerative feedback relation for correcting non-linearity of said applied wave.

5. A wave-form correcting circuit for improving the linearity of a periodic wave which comprises an adding circuit to which said wave is applied, means for differentiating the output of said adding circuit, means for producing a true rectangular wave from said differentiated wave, means for comparing said true rectangular wave and said differentiated wave to obtain a wave that is the difference between them, means for integrating said difference wave to obtain a correcting wave, and means for applying said correcting wave in degenerative feedback relation to said adding circuit whereby it is added to said applied wave to correct its non-linearity.

6. A wave-form correcting circuit for improving the linearity of the envelope of a modulated carrier wave which comprises an amplifier to which said wave is applied, means for demodulating the output of said amplifier, means for differentiating the resulting demodulated wave, means for producing a true rectangular wave from said differentiated wave, means for comparing said true rectangular wave and said differentiated wave to obtain a wave that is the difference between them, and means for applying said difference wave in degenerative feedback relation to said amplifier to vary its gain for correcting non-linearity of said envelope.

7. A wave-form correcting circuit for obtaining a triangular or sawtooth wave of linear wave form from a wave which is non-linear, said circuit comprising means for differentiating the non-linear wave, means for producing a true rectangular wave from said differentiated wave, means for comparing said true rectangular wave and said differentiated wave to obtain a wave that is the difference between them, means for integrating said difference wave, and means for adding said integrated wave in degenerative feedback relation to said non-linear wave before it is differentiated whereby said non-linearity is corrected.

RENE A. BRADEN.

REFERENCES CITED

The following references are of record in the file of this patent:

UNITED STATES PATENTS

| Number | Name | Date |
| --- | --- | --- |
| 2,367,116 | Goldsmith | Jan. 9, 1945 |
| 2,480,511 | Schade | Aug. 30, 1949 |